United States Patent Office 3,564,002
Patented Feb. 16, 1971

3,564,002
CERTAIN 2-HALOALKANOYLAMINO-5-HALO-ALKYL-1,3,4-THIADIAZOLES
William Alan Remers, Suffern, and Gabriel Joseph Gibs, Pearl River, N.Y., and Martin Joseph Weiss, Oradell, N.J., assignors to American Cyanamid Company, Stamford, Conn., a corporation of Maine
No Drawing. Filed Oct. 11, 1968, Ser. No. 766,986
Int. Cl. C07d 91/34
U.S. Cl. 260—306.8    4 Claims

ABSTRACT OF THE DISCLOSURE

The preparation of 2-amino or substituted amino-5-substituted thiadiazoles are described. They are useful in the treatment of ascariasis and as intermediates for the preparation of, for example, 2-(2-amino-5-1,3,4-thiadiazolyl)-1-methyl-5-nitroimidazole which has antiprotozoal and antibacterial properties.

SUMMARY OF THE INVENTION

The present invention relates to novel 2-amino or substituted amino-5-substituted 1,3,4-thiadiazoles and methods of preparing the same.

The compounds of this invention can be defined as those of the formula:

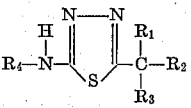

wherein $R_1$ is selected from the group consisting of hydrogen and halogen, $R_2$ and $R_3$ are halogen, $R_4$ is selected from the group consisting of hydrogen, alkanoyl, halo lower alkanoyl, dihalo lower alkanoyl, trihalo lower alkanoyl and the group

taken together is selected from the group consisting of

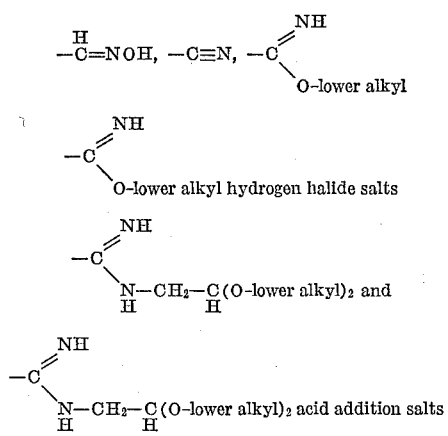

The compounds of the present invention are usually crystalline solids somewhat soluble in water. Those capable of forming acid addition salts in the form of salts are more water soluble.

The compounds of the present invention are useful in the treatment of ascariasis and as intermediates for the preparation of compounds of Formula A, wherein R is lower alkyl as follows:

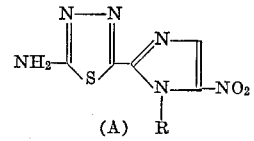

The compounds of Formula (A) show very important oral, broad-spectrum antibacterial activity as well as activity against colibacillosis, fowl typhoid, enteritis and *trichomonas vaginalis* infections.

The preparation of the compounds of the present invention and the conversion to the highly physiologically active 2-(2-amino-5-1,3,4-thiadiazolyl)-1-methyl-5-nitroimidazole is shown in the following flowsheet.

FLOWSHEET

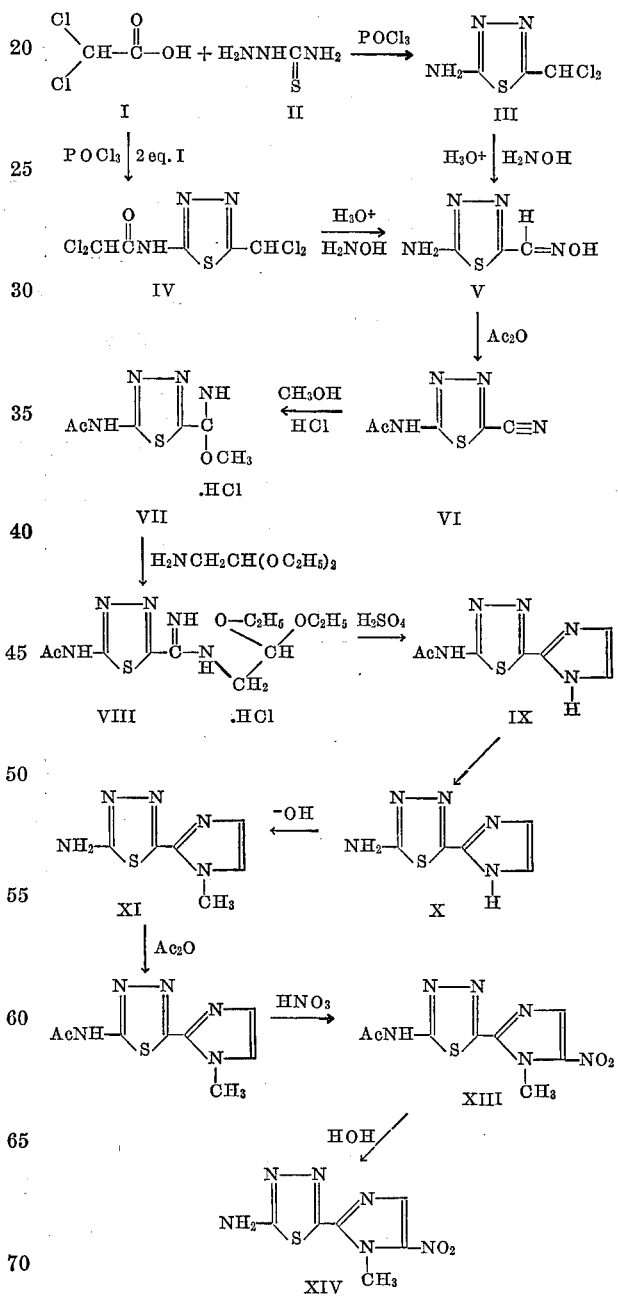

in which Ac is lower alkanoyl

The initial 5-di- and tri-halomethyl-2-aminothiadiazoles are obtained by condensing the corresponding di- and trihaloacetic acid with thiosemicarbazide in the presence of phosphorus oxychloride. The latter reagent serves two functions: (1) to convert in situ the haloacetic acid to the corresponding acid chloride, and (2) in the absence of a second molar equivalent of acid halide or anhydride to activate the intermediate $N_1$-acyl thiosemicarbazide to cyclization via an intermediate such as B.

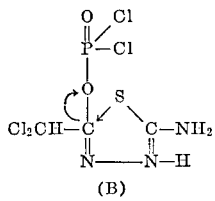

(B)

On the other hand, if two molar equivalents, for example, dichloroacetic anhydride to one equivalent of thiosemicarbazide are used then phosphorus oxychloride serves no purpose and can be omitted. Depending upon the molar ratios the aminothiadiazole product will be obtained as the free amine (III) or the N-acyl amine (IV). In any event, the N-acyl group can be removed or an N-acyl group can be introduced by the usual procedures well known in the art.

An alternative synthesis (XV→XVI, shown below) of the dihalo derivatives involving halogenation of the methyl group in a 2-methyl derivative with, for example, N-bromosuccinimide, is also possible, but is not as attractive since the yields appear to be significantly lower.

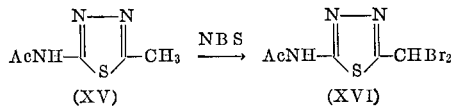

in which Ac is lower alkanoyl.

The halomethyl derivatives are useful per se and also for further transformations. Thus, hydrolysis of the dihalomethyl derivatives (III) in the presence of hydroxylamine gives the amino aldoxime (V) treatment of which with acetic anhydride furnishes the corresponding acetamido nitrile (VI). The nitrile function is useful for the development of the imidazole ring, which is accomplished by conversion to the iminoether (VII) and subsequent treatment with aminoacetaldehyde acetal. The resulting amidine derivative (VIII) is cyclized by treatment with strong acid, preferably sulfuric acid, and the imidazolyl thiadiazole (IX) is formed. Deblocking of the amino nitrogen (to X), methylation under alkaline conditions of the imidazole ring nitrogen (to XI), reacetylation of the amino nitrogen (to XII), nitration to (XIII) and hydrolysis to (XIV) completes the synthesis of 2-(2-amino-5-1,3,4-thiadiazoyl)-1-methyl - 5 - nitroimidazole. The activity of the latter compound and derivatives is shown hereinafter in the examples.

DETAILED DESCRIPTION

The following examples describe in detail the preparation of representative compounds within the scope of the present invention and testing data on conversion products of the present compounds.

EXAMPLE 1

Preparation of 2-dichloroacetamido-5-dichloromethyl-1,3,4-thiadiazole

METHOD A. (FROM DICHLOROACETIC ACID)

In a 3-neck flask equipped with mechanical stirrer, reflux condenser, and dispensing funnel a suspension of 22.8 g. 0.25 M) of thiosemicarbazide in 64.5 g. (0.5 m. 41.8 ml.) of dichloroacetic acid is prepared. The suspension is cooled (ice bath) and slowly 76.8 g. (0.5 m. 45.6 ml.) of phosphorus oxychloride is added from the dispensing funnel with vigorous stirring. After all phosphorus oxychloride is added, the ice bath is removed and replaced by a water bath. The temperature is gradually raised to 70° C. and as the temperature rises hydrogen chloride evolution starts and becomes more pronounced as the temperature nears 70° C. After about one hour hydrogen chloride evolution decreases and an orange solution is obtained which gradually thickens and eventually a gum is obtained which is allowed to stand at 70° C. for one more hour. Heat is removed, the solid is cooled and a large volume of ice water is poured onto it. The gum gradually changes to a white precipitate. The solids are then collected immediately, resuspended in water and the pH adjusted to 6 with 5 N sodium hydroxide solution. The precipitated product is collected and dried. It is then dissolved in hot ethyl acetate, decolorized and concentrated to dryness; 32.3 g. (44%) of product is obtained as pale yellow solid. Recrystallization is accomplished by ethyl acetate or methanol-water, melting point 183–187° C.

METHOD B. (FROM DICHLOROACETIC ANHYDRIDE)

(I) Excess phosphorus oxychloride.—To 0.91 g. (10 mmole) of thiosemicarbazide, 4.78 g. (20 mmole, 3.36 ml.) dichloroacetic anhydride is added with ice-cooling followed by 7 ml. of phosphorus oxychloride. The resulting amber liquid is kept at 60° C. for 3 hours, and then at room temperature for 18 hours. The dark, heavy liquid is poured onto cracked ice where first it forms a gummy precipitate which by addition of some methanol quickly breaks up into a tan solid, which is collected and washed with a little petroleum ether. Yield: 1.51 g., 53%.

(II) Without phosphorus oxychloride.—To 2.97 g. (31.7 mmole) of thiosemicarbazide, 15.46 g. (63.4 mmole) of dichloroacetic anhydride is added with ice cooling. The temperature is gradually brought up to and maintained at 60° C. with stirring for 90 minutes. The resulting golden solution is poured into 70 ml. of 10:1 ice water-methanol. A gummy precipitate is obtained which soon solidifies. The mixture is warmed to 60° C., stirred for a short time and the product collected as orange solids, yield: 4.83 g. (53%).

EXAMPLE 2

Preparation of 2-difluoroacetamido-5-difluoromethyl-1,3,4-thiadiazole and 2-amino-5-difluoromethyl-1,3,4-thiadiazole In a 3-neck flask equipped with mechanical stirrer, reflux condenser, and dispensing funnel a suspension of 4.62 g. (51 mmole) thiosemicarbazide in 10.22 g. (106 mmole) of difluoroacetic acid is prepared. The suspension is cooled in an ice bath and slowly with vigorous stirring 16.4 g. (10.0 ml.) (107 mmole) of phosphorus oxychloride is added from the dispensing funnel. After all phosphorus oxychloride is added the ice bath is replaced by a water bath and the temperature is gradually raised to 70° C. During this period hydrogen chloride evolution starts and becomes more pronounced as the temperature nears 70° C. After hydrogen chloride evolution subsides, a white gum is gradually formed and the substance is kept at 70° C. for 0.75 hr. The gum is then cooled and a large volume of ice water is added to it. The gum changes to a white solid, which is 2-difluoroacetamido-5-difluoromethyl-1,3,4-thiadiazole. Further stirring and heating gradually dissolves this amide. The solution is cooled and the pH is adjusted to 6 with 5 N sodium hydroxide solution. A white crystalline precipitate affords 6.33 g. of 2-amino-5-difluoromethyl-1,3,4-thiadiazole (82%), melting point 183.5–186.5° C. Recrystallization from water gives a melting point of 184–186.5° C.

EXAMPLE 3

Preparation of 2-acetamido-5-dibromomethyl-1,3,4-thiadiazole

A suspension of 6.29 g. (40 mmole) of 2-acetamido-5-methyl-1,3,4-thiadiazole [V. Petrow, O. Stephenson, A. J. Thomas and A. M. Wild, J. Chem. Soc., 1508 (1958)] and 0.1 g. of benzoyl peroxide in 35 ml. of carbon tetrachloride is brought to reflux with stirring. To the suspension, a mixture of 6.94 g. of N-bromo succinimide (0.39 mmole) and 0.1 g. of benzoyl peroxide is added portionwise and is washed in with a total of 10 ml. of carbon tetrachloride. The mixture is stirred and refluxed for 18 hours. Upon cooling, solids are collected by filtration. These solids are then treated with 50 ml. of water to remove formed succinimide. They are filtered again and treated with ether. Ether insolubles are starting material. Upon partial concentration of ether more starting material crystallizes out, and is removed by filtration. Complete concentration affords a product, which after recrystallization from methanol has a melting point at 171–173° C.

EXAMPLE 4

Preparation of 2-trichloroacetamido-5-trichloromethyl-1,3,4-thiadiazole

In a 3-neck flask equipped with mechanical stirrer, reflux condenser, and dispensing funnel a mixture of 18.23 g. (0.2 m.) of thiosemicarbazide and 68.63 g. (0.42 m.) of trichloroacetic acid is prepared. To this mixture slowly with vigorous stirring 64.51 g., 38.6 ml. (0.42 m.) of phosphorus oxychloride is added from the dispensing funnel. After all the phosphorus oxychloride is added, the temperature is gradually raised to 70° C. by a water bath. As the temperature is raised hydrogen chloride evolution is observable. After about one hour at 70° C. a solution is obtained. The temperature is raised to 80° C., hydrogen chloride evolution gradually subsides and the solution gradually thickens to a solid. This solid is kept at 80° C. for one hour. It is then cooled and a large volume of ice-cold water is added to it. A yellow, crystalline precipitate is obtained which is washed with large amounts of water and dried yielding 57.8 g. (79%) of crude product, melting point 161–171° C. Two recrystallizations from ethyl acetate and a decolorization with charcoal gives a melting point of 179–182.5° C.

EXAMPLE 5

Preparation of 2-amino-5-trichloromethyl-1,3,4-thiadiazole, hydrochloride

A 10.94 g. portion of 2-trichloroacetamido-5-trichloromethyl-1,3,4-thiadiazole (Example 4) is heated under reflux in 70 ml. of concentrated hydrochloric acid until solution is obtained. Upon cooling in the refrigerator, the product is obtained as snow white crystals, 3.63 g. (47%). The compound has no definite melting point due to decomposition on heating.

EXAMPLE 6

Preparation of 2-amino-5-trifluoromethyl-1,3,4-thiadiazole

In a 3-neck flask equipped with mechanical stirrer, reflux condenser, and dispenser funnel a suspension of 9.11 g. (0.1 m.) of thiosemicarbazide in 23.95 g., 15.7 ml. (0.21 m.) of trifluoroacetic acid is prepared. The suspension is cooled in an ice bath and slowly with vigorous stirring 30.67 g., 18.3 ml. (0.2 m.) of phosphorus oxychloride is added from the dispensing funnel. After all the phosphorus oxychloride is added, the ice bath is replaced by a water bath. The temperature is gradually raised to 70° C., during which time hydrogen chloride evolution starts and becomes more pronounced as the temperature nears 70° C. After ca. 90 minutes hydrogen chloride evolution stops and a gradually hardening gum is obtained which is kept at 70° C. for one additional hour. The gum is then cooled and a large volume of ice water is poured onto it. The gum changes to a white precipitate which is collected by filtration. The obtained solids are resuspended in water and the pH of the suspension is adjusted to 6.0 with 5 N sodium hydroxide. The white crystalline precipitate is collected and dried, giving 10.10 g. of product. Adjusting the acidic filtrate to pH 6 the same way gives an additional 2.65 g. of product, total yield: 12.75 g. (75%). Recrystallization from ethyl acetate gives a melting point of 216–219° C.

EXAMPLE 7

Preparation of 2-stearamido-5-trifluoromethyl-1,3,4-thiadiazole

A mixture of 1.69 g. (10 mmole) of 2-amino-5-trifluoromethyl-1,3,4-thiadiazole (Example 6) and 3.64 g. (12 mmole) of stearoyl chloride is heated on a hot plate with shaking. Shortly, bubbling is observed due to hydrogen chloride evolution and a solution is obtained. Heating is continued gently for 10 minutes during which time hydrogen chloride evolution subsides and stops. The solution is cooled to room temperature and solidifies to a crystalline, white mass which is collected and washed with a small amount of ether to remove excess stearoyl chloride; 4.16 g. of white crystalline product is obtained (96%) with melting point 111–114° C. A recrystallization from hexane gives a melting point of 114.5–116° C.

EXAMPLE 8

Preparation of 2-propionamido-5-trichloromethyl-1,3,4-thiadiazole

Treatment of 2-amino-5-trichloromethyl-1,3,4-thiadiazole (Example 5) with propionyl chloride by the procedure described in Example 8 produces the compound 2-propionamido-5-trichloromethyl-1,3,4-thiadiazole.

EXAMPLE 9

Preparation of 2-amino-5-dichloromethyl-1,3,4-thiadiazole and 2-amino-1,3,4-thiadiazole-2-carboxaldehyde oxime To an ice-cooled mixture of 9.11 g. (0.1 mole) of thiosemicarbazide and 12.89 g. (0.1 mole) of dichloroacetic acid is added slowly, with vigorous stirring, 30.67 g. (18 ml. 0.2 mole) of phosphorus oxychloride. After this addition is complete the ice bath is replaced by a water bath and the temperature is raised gradually to 70° C. Vigorous evolution of hydrogen chloride ensues as the temperature nears 70° C. and the mixture is briefly cooled to control foaming. After ca. 70 min. gas evolution ceases. The resulting viscous solution is stirred at 70° C. for an additional hour and then is cooled in an ice bath. To the thus-formed 2-amino-5-dichloromethyl-1,3,4-thiadiazole, a solution of 30 g. of hydroxylamine hydrochloride in 50 ml. of water is added followed by 20 ml. of concentrated hydrochloric acid immediately afterward. The mixture is stirred at 70° C. for 5 hours, cooled and filtered to remove some excess hydroxylamine hydrochloride. When the pH of the filtrate is adjusted to 6.0 by addition of 5 N sodium hydroxide, 5 - amino - 1,3,4-thiadiazole-2-carboxaldehyde oxime crystallizes as brownish prisms. It is washed with cold water and dried under reduced pressure. A 10.8 g. yield of material suitable for direct conversion to the nitrile is obtained (if desired, the oxime may be recrystallized from ethanol or from methanol-water).

EXAMPLE 10

Preparation of 2-acetamido-1,3,4-thiadiazole-5-carbonitrile

A mixture of 10.8 g. of the oxime (Example 9) and 100 ml. of acetic anhydride is heated at reflux temperature for 18 hours and then is concentrated under reduced pressure. Then tan solid residue (13 g.) is dissolved in 50 ml. of hot methanol, diluted with 50 ml. of water and cooled. Yellow crystals of the nitrile are obtained. The yield of product melting at 226–230° C. is 8.5 g.

EXAMPLE 11

Preparation of 5-acetamido-1,3,4-thiadiazole-2-carboxamidic acid methyl ester hydrochloride A mixture of 8.40 g. (50 mmoles) of 5-acetamido-1,3,4-thiadiazole-2-carbonitrile (Example 10) and 80 ml. of tetrahydrofuran is treated with 4.05 ml. (3.20 g. 100 mmoles) of methanol, chilled in an ice bath and saturated with anhydrous hydrogen chloride. A solid forms during this saturation process. The mixture is kept at 5° C. for 22 hours and then filtered. The solid imino ether hydrochloride is washed well with ether and can be used at this stage (melting point 202–208° C.; λ max. 2.9, 3.1, 3.4, 5.9μ) directly in the next Example 12.

EXAMPLE 12

Preparation of 5-acetamido-N-(2,2-diethoxyethyl) 1,3,4-thiadiazole-2-carboxamidine hydrochloride The imino ether hydrochloride from Example 11 is added to an ice-cooled mixture of 5.25 g. (50 mmoles) of aminoacetaldehyde diethylacetal and 100 ml. of methanol. The resulting mixture is heated at reflux temperature for 19 hours and is then concentrated under reduced pressure. The gummy residue is triturated with ether containing a little methanol until the amidine hydrochloride crystallizes. The product is washed with ether and air dried. It has λ max. 2.9, 3.4 (broad), 5.9μ; 278 mμ.

EXAMPLE 13

Preparation of 2-acetamido-5-(2-imidazolyl)-1,3,4-thiadiazole

The amidine of Example 12 is added in portions to 20 ml. of concentrated sulfuric acid. The mixture, which foams and becomes warm, is cooled in a water bath when necessary. When complete solution is obtained it is poured onto 100 g. of ice and the resulting solution (filtered if necessary) is brought to pH 6 with 5 N sodium hydroxide (ice cooling). The precipitate that forms is washed with water and dried in air. This procedure gives 5.75 g. of yellow solid product that does not melt below 320° C.

EXAMPLE 14

Preparation of 2-amino-5-(2-imidazolyl)-1,3,4-thiadiazole dehydrochloride

A suspension of 4.18 g. (20 mmoles) of 2-acetamido-5-(2-imidazolyl)-1,3,4-thiadiazole (Example 13) in 50 ml. of concentrated hydrochloric acid is heated at reflux temperature until a clear solution results (40 min.). It is then concentrated under reduced pressure and the residue is dissolved in 10 ml. of water and neutralized to pH 5 with sodium hydroxide. The white solid that forms is washed with water and air dried. A 2.20 g. yield of product that decomposes above 285° C. is obtained.

EXAMPLE 15

Preparation of 2-amino-5-(1-methyl-2-imidazolyl)-1,3,4-thiadiazole

A mixture of 307 mg. (1.85 mmoles) of 2-amino-5-(2-imidazolyl)-1,3,4-thiadiazole (Example 14) and 3.8 ml. of 0.5 N sodium hydroxide is stirred and filtered to remove some insoluble material. The filtrate is treated with 0.17 ml. (1.85 mmoles) of dimethyl sulfate and is stirred for 45 minutes. The solid that separates is washed with water and dried in air. This procedure gives 124 mg. of nearly white crystalline product, melting point 258–260° C.

EXAMPLE 16

Preparation of 2-acetamido-5-(1-methyl-2-imidazolyl)-1,3,4-thiadiazole and 2-acetamido-5-(1-methyl-5-nitro-2-imidazolyl)-1,3,4-thiadiazole A mixture of 124 mg. (0.7 mmole) of 2-amino-5-(1-methyl-2-imidazolyl)-1,3,4-thiadiazole (Example 15) and 0.4 ml. of acetic anhydride is heated on a steam bath for 5 minutes to give 2-acetamido-5-(1-methyl-2-imidazolyl)-1,3,4-thiadiazole. To the resulting mixture is added 1.2 ml. of acetic acid, 0.05 ml. of 70% nitric acid, and an additional 0.2 ml. of acetic anhydride. The mixture is heated on a steam bath and is trated with 0.02 ml. of 70% nitric acid. A vigorous reaction ensues and brown gas is evolved. In about 10 minutes a clear solution is obtained. It is concentrated and the residue is treated with water. The yellow solid that forms is washed with water and is dried in air. This procedure gives 61 mg. of 2-acetamido-5-(1-methyl-5-nitro-2-imidazolyl)-1,3,4-thiadiazole.

EXAMPLE 17

Preparation of 2-amino-5-(1-methyl-5-nitro-2-imidazolyl)-1,3,4-thiadiazole

A mixture of 60 mg. of crude 2-acetamido-5-(1-methyl-5-nitro-2-imidazolyl)-1,3,4-thiadiazole (Example 16) and 0.2 ml. of concentrated hydrochloric acid is heated on a steam bath for 15 minutes, cooled, and concentrated under reduced pressure. The residue is treated with 1 N hydroxide until pH 7 is obtained, whereupon solid separates. This solid is washed with water and dried in air, yield 23 mg. Partition chromatography on diatomaceous earth with a heptane - ethyl acetate - methanol - water (70:30:15:6) system gives several fractions absorbing at 357 mμ. The largest of these fractions, upon concentration, affords yellow crystals which are identical in infrared spectrum and behavior on thin-layer chromatography with authentic sample of 2-amino-5-(1-methyl-5-nitro-2-imidazolyl)-1,3,4-thiadiazole.

EXAMPLE 18

Preparation of chick diet

The following feed composition is employed in all the poultry experiments hereinafter set forth except where otherwise stated:

| | Percent |
|---|---|
| Vitamin premix | 0.5 |
| Trace minerals | 0.1 |
| Sodium chloride | 0.3 |
| Dicalcium phosphate | 1.2 |
| Ground limestone | 0.5 |
| Stabilized fat | 4 |
| Dehydrated alfalfa, 17% | 2 |
| Corn gluten meal, 41% | 5 |
| Menhaden fish meal, 60% | 5 |
| Soybean oil meal, 44% | 30 |
| Ground yellow corn, fine to | 100 |

The vitamin premix in the above feed composition is prepared from the following formulation. The expressions of quantity relate to units per kilogram of the feed composition.

Butylated hydroxy toluene—125 mg.
dl-Methione—500 mg.
Vitamin A—3300 I.U.
Vitamin $D_3$—1100 I.U.
Riboflavin—4.4 mg.
Vitamin E—2.2 I.U.
Niacin—27.5 mg.
Pantothenic acid—8.8 mg.
Choline chloride—500 mg.
Folic acid—1.43 mg.
Menadione sodium bisulfate—1.1 mg.
Vitamin $B_{12}$—11 mcg.
Ground yellow corn, fine to—5 gm.

EXAMPLE 19

The use of 2-(2-amino-5-1,3,4-thiadiazolyl)-1-methyl-5-nitroimidazole and its acetyl derivative in controlling colibacillosis This example demonstrates the effectiveness of 2-(2-amino - 5 - 1,3,4-thiadiazolyl)-1-methyl-5-nitroimidazole in controlling colibacillosis in poultry.

Three groups of 10 five-day old sex-linked pullet chicks are infected parenterally, in the left thoracic air sac, with 0.2 ml. of a $10^{-1}$ dilution of a Trypticase Soy Broth culture of Escherichia coli, the causative agent of colibacillosis in poultry. The compound 2-(2-amino-5-1,3,4-thiadiazolyl)-1-methyl-5-nitroimidazole is administered by gavage as a single oral dose in an aqueous solution or suspension, and the chicks are permitted to feed ad libitum the feed composition prepared in Example 18. Twelve days after treatment, the test is treminated and the number of survivors in each group recorded. The results are compared with two control groups of 20 chicks each, in which one control group is infected and untreated, and the second control group is uninfected and untreated. The results of the test are set forth in the following table:

TABLE I

| Compound | Dose*, mg. | Total chicks tested | Survivors |
|---|---|---|---|
| 2-(2-amino-5-1,3,4-thiadiazolyl)-1-methyl-5-nitroimidazole. | 160 | 10 | 10 |
|  | 80 | 10 | 10 |
|  | 40 | 10 | 10 |
| Control: |  |  |  |
| Infected, untreated |  | 20 | 2 |
| Uninfected, untreated |  | 20 | 20 |

*Dose is in terms of milligrams per kilogram of body weight.

Four groups of 40, five-day old sex-linked pullet chicks are infected in the same manner as herein set forth with Escherichia coli. The compound 2-(2-acetamido-5-1,3,4-thiadiazolyl)-1-methyl-5-nitroimidazole is administered by gavage as a single oral dose in an aqueous medium, and the chicks are permitted to feed ad libitum the feed composition prepared in Example 18. Twelve days after treatment, the test is terminated and the number of survivors in each group recorded. The results are compared with two control groups of 40 chicks each, in which one control group is infected and untreated, and the second control group is uninfected and untreated. The results of the test are set forth in the following table.

TABLE II

| Compound | Dose*, mg. | Total chicks tested | Survivors |
|---|---|---|---|
| 2-(2-acetamido-5-1,3,4-thiadiazolyl)-1-methyl-5-nitroimidazole. | 40 | 40 | 39 |
|  | 20 | 40 | 35 |
|  | 10 | 40 | 29 |
| Control: |  |  |  |
| Infected, untreated |  | 40 | 3 |
| Uninfected, untreated |  | 40 | 40 |

*Dose is in terms of milligrams per kilogram of body weight.

EXAMPLE 20

Utilization of 2-(2-amino-5-1,3,4-thiadiazolyl)-1-methyl-5-nitroimidazole and derivatives in controlling fowl typhoid This example demonstrates the effectiveness of 2-(2-amino-5-thiadiazolyl)-1-methyl-5-nitroimidazole, 2-(2-acetamido-5-thiadiazolyl)-1-methyl-5-nitroimidazole, 2-(2-methylamino-5-thiadiazolyl)-1-methyl-5-nitroimidazole and 2-(3-dimethylamino-5-thiadiazolyl)-1-methyl-5-nitroimidazole in controlling fowl typhoid.

Nine groups, eight groups of five and one of ten, of one-day old sex-linked pullet chicks are infected orally by gavage with 0.5 ml. of a $10^{-2}$ dilution of a five-hour Trypticase Soy Broth culture of Salmonella gallinarum, the causative agent of fowl typhoid. Each chick received approximately $6 \times 10^5$ viable cells.

Medication is administered continuously in the feed, beginning 3 hours before infection and continuing for 10 days, at which time the test is terminated and the number of survivors in each group recorded. The results are compared with two control groups of chicks, the first group comprising 20 chicks which are infected and untreated, and the second group comprising 10 chicks which are uninfected and untreated. The results of the test are set forth in the following table.

TABLE III

| Compound | Dose*, percent | Total chicks tested | Survivors |
|---|---|---|---|
| 2-(2-amino-5-1,3,4-thiadiazolyl)-1-methyl-5-nitroimidazole | 0.1 | 10 | 9 |
|  | 0.05 | 5 | 5 |
|  | 0.025 | 5 | 5 |
|  | 0.006 | 5 | 1 |
| 2-(2-acetamido-5-1,3,4-thiadiazolyl)-1-methyl-5-nitroimidazole | 0.1 | 5 | 5 |
|  | 0.25 | 5 | 4 |
|  | 0.006 | 5 | 3 |
| 2-(2-methylamino-5-1,3,4-thiadiazolyl)-1-methyl-5-nitroimidazole | 0.1 | 5 | 3 |
| 2-(2-dimethylamino-5-1,3,4-thiadiazolyl)-1-methylnitroimidazole | 0.1 | 5 | 4 |
| Control: |  |  |  |
| Infected, untreated |  | 20 | 0 |
| Uninfected, untreated |  | 10 | 10 |

*Dose is in terms of percentage by weight of the feed composition prepared in Example 18.

EXAMPLE 21

Utilization of 2-(2-amino-5-1,3,4-thiadiazolyl)-1-methyl-5-nitroimidazole in controlling enteritis Three groups of ten female Swiss Webster mice weighing 20 gm. were infected intraperitoneally with 0.5 ml. of $10^{-2}$ dilution of a five-hour Trypticase Soy Broth culture of Salmonella choleraesuis var. kunzendorf, the causative agent of enteritis in pigs, an organism originally recovered from a field outbreak of Salmonella choleraesuis var. kunzendorf in pigs. Each mouse received approximately $4.6 \times 10^7$ cells as the inoculating dose.

The mice are fed a medicated feed, which is a commercial mouse chow containing the compound 2-(2-amino-5-1,3,4-thiadiazolyl)-1-methyl-5-nitroimidazole, for 3 hours before infection until 7 days after infection. The mice are held for an additional 7 days after the medication is stopped, and the number of survivors in each group recorded. The medicated feed is prepared by thoroughly admixing calculated amounts of 2-(2-amino-5-1,3,4-thiadiazolyl)-1-methyl-5-nitroimidazole with commercial mouse chow to provide essentially uniform distribution in the feed offered. The above results are compared with two control groups of ten mice each, in which one control group is infected and untreated, and the second control group is uninfected and untreated. The results of the test are set forth in the following table:

TABLE IV

| Compound | Dose*, percent | Total mice tested | Survivors |
|---|---|---|---|
| 2-(2-amino-5-1,3,4-thiadiazolyl)-1-methyl-5-nitroimidazole | 0.1 | 10 | 10 |
|  | 0.025 | 10 | 9 |
|  | 0.006 | 10 | 1 |
| Control: |  |  |  |
| Infected, untreated |  | 10 | 2 |
| Uninfected, untreated |  | 10 | 10 |

*Dose is in terms of percentage by weight of the commercial mouse chow.

EXAMPLE 22

Utilization of 2-(2-amino-5-1,3,4-thiadiazolyl)-1-methyl-5-nitroimidazole in controlling Trichomonas vaginalis infections This example demonstrates, employing two modes of administration, the efficacy of 2-(2-amino-5-1,3,4-thiadiazolyl)-1-methyl-5-nitroimidazole against Trichomonas vaginalis infections.

The first mode of administration, hereinafter designated Test A, employs six groups of mice, three groups of five and three groups of ten. The mice are inoculated with 50,000 culture-derived Trichomonas vaginalis (Thoms strain). The above compound is thoroughly mixed into ground feed and presented to the mice one day after inoculation. The average ad libitum drug intake, that is milligrams per kilogram of body weight per day, is estimated from the drug diet intake for 5 full days, and mouse weights taken just before and just after treatment.

The second mode of administration, hereinafter designated Test B, employs six groups of mice, fiive groups of ten and one of five. The mice are inoculated with 50,000 culture-derived *Trichomonas vaginalis* (Thoms strain). The above compound is administered in a single oral dose by gavage one day after inoculation.

Six days of post inoculation scrapings, from the subcutaneous sites of inoculation, are searched microscopically for motile trichomonads, and antitrichomonal activity is concluded in those instances where motile trichomonads are eliminated from lesions present at the site of inoculation.

Mouse body weight gain from day 1 to day 6 post-inoculation shows that 2-(2-amino-5-1,3,4-thiadiazolyl)-1-methyl-5-nitroimidazole is well tolerated by the animals ingesting same. Furthermore, experimentation demonstrates that more than 1,000 mg. per kilogram of body weight of said compound is well tolerated.

The results of the test are set forth in the following tables:

TABLE V.—TEST A

| Compound | Dose,* mg. | Total mice tested | Cleared | Percentage cleared |
|---|---|---|---|---|
| 2-(2-amino-5-1,3,4-thiadiazolyl)-1-methyl-5-nitroimidazole | 170 | 5 | 5 | 100 |
|  | 95 | 5 | 5 | 100 |
|  | 90 | 10 | 10 | 100 |
|  | 65 | 5 | 4 | 80 |
|  | 44 | 10 | 3 | 30 |
|  | 10 | 10 | 0 | 0 |

*Dose is in terms of milligrams per kilogram of body weight per day.

TABLE VI.—TEST B

| Compound | Dose,* mg. | Total mice tested | Cleared | Percentage cleared |
|---|---|---|---|---|
| 2-(2-amino-5-1,3,4-thiadiazolyl)-1-methyl-5-nitroimidazole | 100 | 5 | 5 | 100 |
|  | 50 | 10 | 10 | 100 |
|  | 50 | 10 | 10 | 100 |
|  | 25 | 10 | 9 | 90 |
|  | 12 | 10 | 7 | 70 |
|  | 6 | 10 | 2 | 20 |

*Dose is in terms of milligrams per kilogram of body weight.

What is claimed is:
1. A 1,3,4-thiadiazole of the formula:

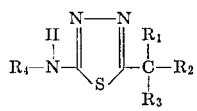

wherein $R_1$ is selected from the group consisting of hydrogen, chlorine and fluorine; $R_2$ and $R_3$ taken together are selected from the group consisting of dichloro and difluoro; $R_4$ is selected from the group consisting of difluoro lower alkanoyl, dichloro lower alkanoyl and trichloro lower alkanoyl and acid addition salts thereof.

2. A compound 2-trichloroloweralkanoylamido-5-trichloromethyl-1,3,4-thiadiazole.

3. The compound 2 - trichloroacetamido - 5 - trichloromethyl-1,3,4-thiadiazole.

4. The compound, 2-dichloroacetamido - 5 - dichloromethyl-1,3,4-thiadiazole.

References Cited

Katritzky (ed.): Advances in Heterocyclic Chemistry, Academic, 1968, pp. 174–9.

Lalezari et al.; Chem. Abstracts, 65:18575–6 (1960).

ALEX MAZEL, Primary Examiner

R. J. GALLAGHER, Assistant Examiner

U.S. Cl. X.R.

424—270